3,272,804
PROCESS AND INTERMEDIATES FOR
PREPARING INDOLES
Sydney Archer, Bethlehem, N.Y., Charles Frederick Koelsch, St. Paul, Minn., and Roman R. Lorenz, and Benjamin F. Tullar, East Greenbush, N.Y., assignors to Sterling Drug Inc., New York, N.Y., a corporation of Delaware
No Drawing. Filed Dec. 23, 1963, Ser. No. 332,949
22 Claims. (Cl. 260—240)

The present invention relates to a new process for the preparation of compounds of the arylo[b]pyrrole class represented by the formula

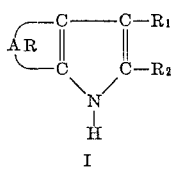

I where AR, together with C=C group to which it is attached represents an aryl nucleus, that is an aryl nucleus fused to the pyrrole ring; $R_1$ represents a member of the group consisting of a hydrogen atom, a lower-alkyl group, and a phenyl group; and $R_2$ represents a member of the group consisting of a hydrogen atom and a lower-alkyl group.

When $R_1$ or $R_2$ represent a lower-alkyl group, they can contain from one to six carbon atoms and can be straight or branched as exemplified by methyl, ethyl, n-propyl, isopropyl, n-butyl, n-pentyl, n-hexyl, and the like.

When $R_1$ represents phenyl, the benzene ring thereof can be unsubstituted or can bear one or more substituents of low molecular weight and of such nature that they do not interfere with or take part in the reaction. Examples of such substituents include lower-alkyl, halo, lower-alkoxy, lower-alkylmercapto, lower-alkylsulfonyl, trifluoromethyl, sulfamyl, methylenedioxy, benzyloxy, nitro, cyano, di-lower-alkylamino, and the like Moreover, since as will be understood from the description of the process given hereinafter, the aryl nucleus fused to the pyrrole ring is remote from the site of the reaction, the exact nature of the aryl nucleus is not critical, the only requirement being that it be of such nature that it does not take part in or interfere with the course of the reaction.

Thus the aryl nucleus can be of any mono- or polycyclic, homo- or heterocyclic aromatic nucleus as exemplified by fused benzo-, pyrido-, pyrimido-, naphtho-, or quinolino-, the nuclei of which can be unsubstituted or can bear one or more substituents of low molecular weight and of such nature that they do not take part in or interfere with the course of the reaction. Examples of such substituents include lower-alkyl, halo, lower-alkoxy, lower-alkylmercapto, lower-alkylsulfonyl, trifluoromethyl, sulfamyl, methylenedioxy, benzyloxy, nitro, cyano, di-lower-alkylamino, and the like.

Also included within the purview of the instant process is the preparation of 1,3,4,5-tetrahydrobenz[c,d]indoles, the parent member of which has the structure:

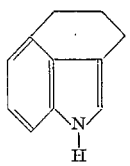

which will be recognized as being related to lysergic acid. Compounds of the above structure can be regarded as derivatives of indole in which the 3- and 4- positions of the indole nucleus are connected by a propylene chain. The propylene chain can, of course, bear further functional groups, for example, amino, hydroxy, keto, halogen, and the like, which can be used as "handles" for building up the remaining fourth ring of lysergic acid itself. Therefore the grouping

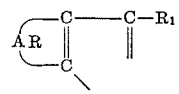

of Formula I is to be understood to encompass also the tetrahydronaphthalene group:

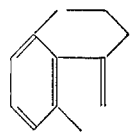

It will be appreciated that when the aryl nucleus, AR, in the compound of general Formula I is a benzene nucleus fused to the pyrrole ring, the compounds produced by the process are derivatives of indole. The present process, therefore, could be described generally as being a new synthesis of indole-type compounds. And like other known indole syntheses, the present synthesis can be adapted to prepare not just indole itself, or nuclear substituted-indoles, but also compounds which bear only a formal relationship to indole in that they possess either a mono- or polycyclic aryl residue fused to the 2,3-positions of the pyrrole ring.

Generally known methods for the synthesis of indole or of indole-type compounds require a cyclization in the pyrrole ring and may be divided broadly into three classes depending upon whether cyclization takes place (a) between the pyrrole nitrogen atom and the α-carbon atom of the pyrrole ring; (b) between the α- and β-carbon atoms of the pyrrole ring; or (c) between the β-carbon atom of the pyrrole ring and the benzene nucleus.

The present process belongs to the second class of synthetic procedures, that is, it requires a cyclization between the α- and β-carbon atoms of the pyrrole nucleus, and it will be seen from the description given hereinafter that the instant process provides several advantages both of a technical and of an economic nature over presently available methods of this class.

Of the various methods for the preparation of indoles or indole-type compounds involving cyclization between the α- and β-carbon atoms of the pyrrole ring, the best known and perhaps most widely used method is the Madelung reaction which, for the preparation of indole itself, requires the reaction of N-formyl-o-toluidine with sodium anilide in the presence of potassium formate. The reaction is illustrated by the equation:

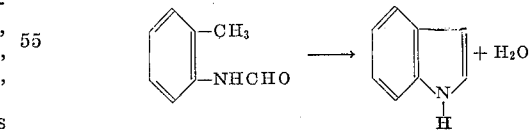

The Madelung reaction, however, possesses the disadvantages of producing a thick, difficultly stirred reaction mixture and a vigorous evolution of aniline-laden gases at the temperature (generally from 290–360° C.) required for the cyclization. The Madelung process, moreover, requires the use of a 6:1 molar ratio of sodium anilide to the N-formyl compound, the cost of which, added to that of the potassium formate also required, renders the Madelung synthesis prohibitively expensive for large-scale commercial use. Thus for both technical and economic reasons, the Madelung synthesis is limited in its usefulness and is essentially only a laboratory tool of little or no commercial value.

We have discovered an entirely new process for the preparation of indoles or indole-type compounds which not only overcomes all of the disadvantages of the Madelung synthesis but which, we have discovered, is also of general applicability to the synthesis of arylo[b]pyrroles of general Formula I above.

According to the present invention, an N-(ortho-lower-alkyl-aryl)-N′-arylamidine or N - (ortho - phenylmethyl-aryl)-N′-arylamidine of the formula

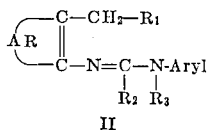

II where AR, $R_1$, and $R_2$ have the meanings given above, $R_3$ is a hydrogen atom or a lower-alkyl group, and Aryl is an aromatic radical of a nature to be more fully described hereinafter, is heated with the sodium salt of an aromatic amine of Formula III

III where Aryl and $R_3$ have the meanings given above. The reaction is preferably carried out in an excess of the said aromatic amine at the boiling point thereof. The course of the reaction is represented by the equations:

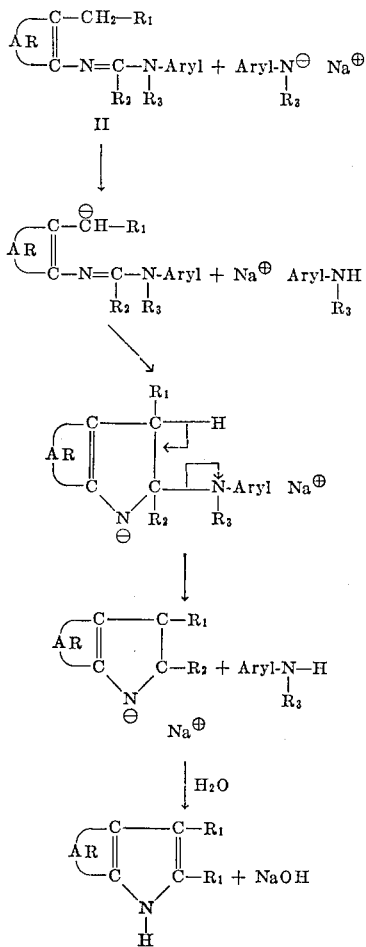

The reaction is carried out by reacting the amidine of Formula II with at least one molar equivalent of the sodium salt of the amine of Formula III and preferably in an excess of the amine. The reaction is generally carried out at the reflux temperature of the amine used as solvent, it being generally preferred to maintain the temperature in the range from 180 to 300° C.

It will be appreciated from a consideration of the above equations that the aromatic amine:

III 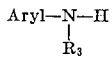

is involved in the reaction not only as solvent, but also as the condensing agent, in the form of its sodium salt, and furthermore is eliminated from the amidine reactant after cyclization of the latter. This interdependence of the amidine, the solvent, and the condensing agent therefore requires that the Aryl and $R_3$ groups be the same in all three agents.

It will be further appreciated, however, that since the amine, whether present in the reaction as solvent, or as the condensing agent (in the form of its sodium salt) or as a portion of the amidine reactant, is not included as such in the product formed, but rather functions either as a proton donor (to form the sodium salt), as a proton acceptor (from the amidine II by the sodium salt of III), or to reform the solvent (when eliminated from the product), the exact nature of the aromatic amine is not critical. Therefore, any aromatic amine, whether substituted in the aromatic nucleus or not, which will function as solvent, as proton donor or, in the form of its sodium salt, as a proton acceptor, but which is otherwise inert under the conditions of the reaction, will serve in the practice of the invention. The Aryl group of the arylamine thus can be, for example, phenyl, m-tolyl, p-tolyl, or α- or β-naphthyl. A preferred aryl group is phenyl.

The group $R_3$ in the above general Formula II can be hydrogen or a lower-alkyl group where the lower-alkyl group contains from one to about six carbon atoms, and is either straight or branched as exemplified by methyl, ethyl, n-propyl, isopropyl, n-butyl, n-amyl, n-hexyl, and the like. It has been found that generally higher yields are obtained, and the reaction temperature can be substantially decreased, if amines where $R_3$ is a lower-alkyl radical are used as the solvent and the source of the sodium salt. Furthermore, the preparation of the sodium salt of the amines where $R_3$ is lower-alkyl is more readily and safely prepared than in the case where $R_3$ is hydrogen, since the reaction in the former case is smoother and more readily controlled. Therefore it is particularly advantageous to employ compounds wherein $R_3$ is lower-alkyl, and a preferred amine is N-methylaniline.

Since each mole of the amidine, II, requires one mole of the sodium salt of the amine, III, in order to form the sodium salt of the former, it follows that at least one molar equivalent of the sodium salt of the amine of Formula III is required in the reaction. A large excess of the sodium salt, of course, can be used but to no particular advantage, and it has been found that optimum results are obtained when the molar ratio of sodium salt to amidine is around 1.5:1, and this is a particularly preferred ratio of reactants.

The process, when practiced as described above, affords readily stirred reaction mixtures without the violent gas evolution problems encountered in the Madelung synthesis, and consequently, unlike the latter, is readily adaptable to large, commercial-scale use. The present process moreover affords substantial economic advantages over the Madelung synthesis first in eliminating entirely the need for potassium formate (approximately two moles per mole of amine being required in the Madelung reaction) and second in sharply decreasing the necessary ratio of the sodium-amine salt condensing agent. The present method furthermore is generally conducted at lower temperatures than those required in the Madelung reaction, the temperature reduction being even greater when amines where $R_3$ is lower-alkyl are used. Such reduction in the reaction temperature affords a further advantage over the Madelung method, since a simplification in the production equipment as well as a simplification in the operation and maintenance thereof is realized.

A still further advantage in the present process over the Madelung reaction results from the fact that in the instant process, the amine

III which is used not only as the solvent but also as the source of the sodium-amine salt condensing agent and as a portion of the amidine reactant, is fully recoverable from all three agents after completion of the reaction and can thus be recycled in future runs thereby affording further economies in the process. While a combined mineral oil-amine mixture can be successfully employed in the present process, no advantage is gained thereby.

The Madelung reaction on the other hand, employs a mixed solvent medium consisting of toluene and mineral oil, in addition to the sodium anilide used as the condensing agent, which requires more elaborate and careful techniques for the recovery, separation, and purification of each component for reuse.

The amidines of Formula II, which are required as reactants in the practice of the present invention, are in themselves novel compounds and are considered to be within the purview of the instant invention. They are prepared by either of two methods. The first of these consists in reacting a lower-alkyl aryl-imidate ester with an arylamine. The reaction is represented by the equation:

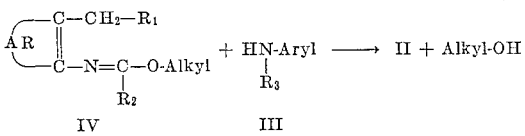

where AR, Aryl, $R_1$, $R_2$, and $R_3$ have the meanings given above.

The reaction is carried out in an excess of the amine of Formula III and at a temperature sufficiently high that the alcohol, Alkyl-OH, is distilled off as it is produced in the reaction. The amidine of Formula II thus produced can, if desired, be isolated from its solution in the amine and purified before further reaction. Such isolation is not essential, however, and the reaction mixture containing the amidine and the amine can, if desired, be used directly in the next step of the synthesis.

In fact it will be readily apparent to one skilled in the art that the process can, if desired, be carried out in essentially one step by reacting the lower-alkyl arylimidate ester of Formula IV with the arylamine of Formula III in the presence of at least two moles of the sodium salt of the latter. The additional mole of the sodium amine salt is required in this instance because the ethanol initially produced reacts with one mole of the sodium amine salt to form sodium ethoxide, and the latter is not a sufficiently strong base to effect cyclization of the amidine. In such procedure, the amidine of Formula II is undoubtedly formed in the reaction as before but, in the presence of the sodium amine salt condensing agent, is cyclized without isolation. The reaction conditions are the same as described above for the cyclization of the amidines of Formula II except that initially, during reaction of the imidate ester with the amine to form the amidine of Formula II, the reaction becomes exothermic, and the temperature should be maintained in the range from around 50–150° C. When formation of the amidine is complete, the reaction temperature is then increased to from 180° C. to 300° C. The reaction is represented by the equation:

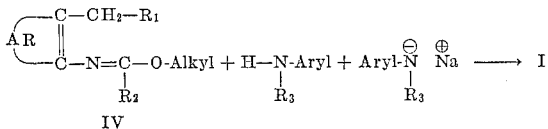

A second method for the preparation of the amidines of Formula II comprises reacting a formyl or lower-alkanoyl amide of the amines of Formula III with phosphorus oxychloride and reacting the resulting amide-phosphorus oxychloride adduct with an appropriate o-lower-alkyl-arylamine or o-phenylmethyl-arylamine of Formula VI below as represented by the equations:

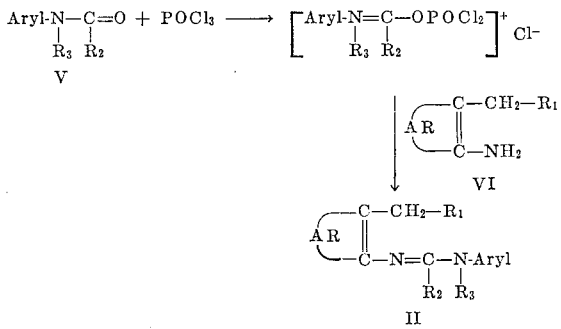

The reaction is generally carried out at room temperature in an organic solvent inert under the conditions of the reaction, for example benzene, toluene, or xylene, and the product is isolated in conventional manner after hydrolysis of the formamidine hydrochloride.

The lower-alkyl aryl-imidate esters required as starting materials in the first-described method for the preparation of the amidines are produced by reacting a lower-alkyl ortho-lower-alkanoate ester with an o-lower-alkyl-arylamine or o-phenylmethyl-arylamine of Formula VI according to the reaction:

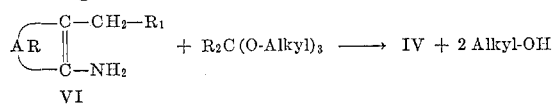

The reaction is carried out under anhydrous conditions, in the presence of a small amount of anhydrous mineral acid, and at a temperature in the range from about 80° C. to 150° C.

During the course of the latter reaction, a substantial amount of a bis-amidine of the structure

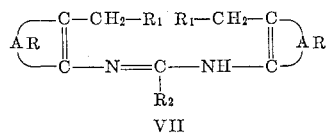
VII is often formed as a side product resulting from the reaction of two moles of the arylamine of Formula VI with one mole of the lower-alkyl ortho-lower-alkanoate ester. This bis-amidine, however, can be recovered and reacted, at reflux temperature, with an excess of the ortho ester to produce the desired lower-alkyl aryl-imidate ester of Formula IV.

The structures of the compounds produced by the process of the instant invention are established by the correspondence between calculated and found values for the elements determined by chemical analysis; by the correspondence between physical constants such as the index of refraction or melting point of the compounds so obtained and known values for the compounds; by conversion of the products to known derivatives and determining the correspondence between the physical constants obtained for such derivatives and known values therefor; and by the infra-red, ultra-violet, and NMR spectra of the compounds.

The following examples will further illustrate the invention without the latter being limited thereto.

I. PREPARATION OF THE INTERMEDIATE AMIDINES OF FORMULA II

A. *Via the lower-alkyl aryl-formimidate esters of Formula IV*

EXAMPLE 1.—N-(2-METHYLPHENYL)-N'-METHYL-N'-PHENYLFORMAMIDINE

To a mixture of 108 g. (1.0 mole) of o-toluidine and 2 g. (0.014 mole) of o-toluidine hydrochloride, warmed to 50° C., was added 222 g. (1.5 moles) of ethyl orthoformate. The mixture was heated under a distilling column for one and a half hours during which time 112 ml. of ethanol was collected as the pot temperature rose from 88° C. to 160° C. The residue was distilled in vacuo to give a forerun of 79 g. of excess ethyl orthoformate (B.P. 50° C./15 mm.). The product, ethyl (2-methylphenyl)formimidate (146 g., 89%), was collected at 110° C./15 mm. ($n_D^{25} = 1.5195$).

A mixture of 164 g. (1.0 mole) of ethyl (2-methylphenyl)formimidate and 216 g. (2.0 moles) of N-methylaniline was heated on a steam bath under a reflux condenser at 20 mm. for fifteen hours. The condenser was then set for distillation and the mixture heated at 200° C. for four hours during which time material boiling up to 120° C./19 mm. was collected. The residue was poured into 100 ml. of isopropyl acetate, and the solid which separated from the cooled mixture was collected and dried to give a first crop of 60 g. of N-(2-methylphenyl)-N'-methyl-N'-phenylformamidine, M.P. 98–100° C. The solvent was removed from the filtrate under reduced pressure, and the residue was heated at from 105° to 180° C. with 47 g. of acetic acid while an additional quantity of ethanol distilled over. Removal of the remaining solvent under reduced pressure and crystallization of the residue from isopropyl acetate as before afforded an additional 76 g. of N-(2-methylphenyl)-N'-methyl-N'-phenylformamidine, M.P. 98–100° C. (uncorr.). (Total yield 61%.)

EXAMPLE 2.—N-(3-METHYL-2-PYRIDYL)-N'-METHYL-N'-PHENYLFORMAMIDINE

Ethyl (3-methyl-2-pyridyl)formimidate was prepared from 109.1 g. (1.0 mole) of 2-amino-3-methylpyridine, 222 g. (1.5 moles) of ethyl orthoformate and 2 ml. of saturated ethanolic hydrogen chloride using the manipulative procedure described above in Example 1. The mixture was heated up to 150° C. while collecting a total of 130 ml. of distillate. Fractionation of the residue afforded 111 g. of ethyl (3-methyl-2-pyridyl)formimidate, B.P. 107–109° C./14 mm.

The latter (65.5 g., 0.4 mole) was reacted with 128.5 g. (1.2 moles) of N-methylaniline using the manipulative procedure described above in Example 1. The mixture was heated at from 110° to 185° C. while collecting 19 ml. of ethanol as distillate. The excess N-methylaniline was removed under reduced pressure, and the residue was fractionated to give 83.5 g. (93%) of N-(3-methyl-2-pyridyl)-N'-methyl-N'-phenylformamidine, B.P. 148–155° C./0.5 mm. A small sample, recrystallized from n-pentane, afforded material of M.P. 68–69° C. (uncorr.).

*Analysis.*—Calcd. for $C_{14}H_{15}N_3$: C, 74.64; H, 6.71; N, 18.65. Found: C, 74.39; H, 6.84; N, 18.78.

In another preparation of ethyl (3-methyl-2-pyridyl)formimidate from 327.3 g. (3 moles) of 2-amino-3-methylpyridine, 890 g. (6 moles) of ethyl orthoformate, and 6 ml. of saturated ethanolic hydrogen chloride, a total of 282 g. of product, B.P. 119–122° C./28 mm. was obtained leaving a residue of 140 g. of N,N'-bis-(3-methyl-2-pyridyl)formamidine.

The above N,N'-bis-(3-methyl-2-pyridyl)formamidine (140 g., 0.66 mole) was heated with 147 g. (0.99 mole) of ethyl orthoformate at from 130–150° C. for two and a half hours during which time the ethanol produced in the reaction was distilled off. The residue was fractionated giving 134 g. of ethyl (3-methyl-2-pyridyl)formimidate, B.P. 118–121° C./21 mm.

EXAMPLE 3.—N-(2-METHYL-4-METHOXYPHENYL)-N'-METHYL-N'-PHENYLFORMAMIDINE

Ethyl (2-methyl-4-methoxyphenyl)formimidate was prepared from 100 g. (0.73 mole) of 2-methyl-4-methoxyaniline, 216 g. (1.46 moles) of ethyl orthoformate, and 2 ml. of saturated ethanolic hydrogen chloride using the manipulative procedure described above in Example 1. The mixture was heated for three and a half hours up to 150° C. while collecting 84 ml. of ethanol. Fractionation of the residue gave 114 g. of ethyl (2-methyl-4-methoxyphenyl)formimidate, B.P. 85–94° C./0.3 mm.

*Analysis.*—Calcd. for $C_{11}H_{15}NO$: C, 68.38; H, 7.82; N, 7.25. Found: C, 68.19; H, 7.48; N, 6.97.

The latter (114 g., 0.59 mole) was reacted with 127 g. (1.18 moles) of N-methylaniline in the presence of 36 g. of acetic acid using the manipulative procedure described above in Example 1. The mixture was heated at 100–190° C. while collecting 35 ml. of ethanol as distillate. Fractionation of the residue afforded 63 g. of N-(2-methyl-4-methoxyphenyl)-N'-methyl-N'-phenylformamidine, B.P. 168–176° C./0.5 mm.

*Analysis.*—Calcd. for $C_{16}H_{18}N_2O$: C, 75.56; H, 7.16; N, 11.02. Found: C, 75.41; H, 7.15; N, 11.22.

EXAMPLE 4.—N-(2,6-DIMETHYL-3-PYRIDYL)-N'-METHYL-N'-PHENYLFORMAMIDINE

Ethyl (2,6-dimethyl-3-pyridyl)formimidate was prepared from 244 g. (2.0 moles) of 3-amino-2,6-dimethylpyridine, 593 g. (4.0 moles) of ethyl orthoformate, and 4 ml. of saturated ethanolic hydrogen chloride using the manipulative procedure described above in Example 1. The mixture was heated for four hours while collecting 225 ml. of ethanol. Fractionation of the residue gave 323 g. (91%) of ethyl (2,6-dimethyl-3-pyridyl)formimidate, B.P. 133–135° C./20 mm.

The latter (178 g., 1.0 mole) was reacted with 161 g. (1.5 moles) of N-methylaniline in the presence of 60 g. of acetic acid using the manipulative procedure described above in Example 1. The mixture was heated at 100–185° C. while collecting 40 ml. of ethanol as distillate. Fractionation of the residue gave 164 g. of N-(2,6-dimethyl-3-pyridyl)-N'-methyl-N'-phenylformamidine, B.P. 156–161° C./0.5 mm.; $n_D^{25} = 1.6336$.

*Analysis.*—Calcd. for $C_{15}H_{17}N_3$: C, 75.28; H, 7.16; N, 17.56. Found: C, 75.35; H, 7.24; N, 17.62.

EXAMPLE 5.—N-(3-METHYL-4-PYRIDYL)-N'-METHYL-N'-PHENYLFORMAMIDINE

Ethyl (3-methyl-4-pyridyl)formimidate was prepared from 80 g. (0.73 mole) of 4-amino-3-methylpyridine, 216 g. (1.46 moles) of ethyl orthoformate, and 2 ml. of saturated ethanolic hydrogen chloride using the manipulative procedure described above in Example 1. The mixture was heated up to 150° C. while collecting a total of 105 ml. of distillate. Fractionation of the residue afforded 105.5 g. of ethyl (3-methyl-4-pyridyl)formimidate, B.P. 141–147° C./27 mm.

The latter was reacted with 137 g. (1.28 moles) of N-methylaniline using the manipulative procedure described above in Example 1. The mixture was heated slowly from 128° C. to 190° C. while distilling over the ethanol produced in the reaction. Fractionation of the reaction mixture afforded 117 g. of N-(3-methyl-4-pyridyl)-N'-methyl-N'-phenylformamidine, B.P. 160–170° C./0.2 mm. A small sample, recrystallized from n-heptane, afforded material of M.P. 60–61° C. (uncorr.).

*Analysis.*—Calcd. for $C_{14}H_{15}N_3$: C, 74.64; H, 6.71; N, 18.65. Found: C, 74.69; H, 6.85; N, 18.72.

EXAMPLE 6.—N-(2-ETHYLPHENYL)-N'-METHYL-N'-PHENYLFORMAMIDINE

By reacting 2-ethylaniline with ethyl orthoformate in the presence of anhydrous ethanolic hydrogen chloride using the manipulative procedure described above in Example 1, there can be obtained ethyl (2-ethylphenyl)formimidate.

By reacting the latter with N-methylaniline using the manipulative procedure described above in Example 1, there can be obtained N-(2-ethylphenyl)-N'-methyl-N'-phenylformamidine.

EXAMPLE 7.—N-(2-METHYLPHENYL)-N'-METHYL-N'-PHENYLACETAMIDINE

By reacting o-toluidine with ethyl orthoacetate in the presence of anhydrous ethanolic hydrogen chloride using the manipulative procedure described above in Example 1, there can be obtained ethyl (2-methylphenyl)acetimidate.

By reacting the latter with N-methylaniline using the manipulative procedure described above in Example 1, there can be obtained N-(2-methylphenyl)-N'-methyl-N'-phenylacetamidine.

EXAMPLE 8.—N-(3-METHYL-2-QUINOLYL)-N'-METHYL-N'-PHENYLFORMAMIDINE

By reacting 2-amino-3-methylquinoline with ethyl orthoformate in anhydrous ethanolic hydrogen chloride using the manipulative procedure described above in Example 1, there can be obtained ethyl (3-methyl-2-quinolyl)formimidate.

By reacting the latter with N-methylaniline using the manipulative procedure described above in Example 1, there can be obtained N-(3-methyl-2-quinolyl)-N'-methyl-N'-phenylformamidine.

EXAMPLE 9.—N-(2-BENYLPHENYL)-N'-METHYL-N'-PHENYLFORMAMIDINE

By reacting 2-benzylaniline with ethyl orthoformate in anhydrous ethanolic hydrogen chloride using the manipulative procedure described above in Example 1, there can be obtained ethyl (2-benzylphenyl)formimidate.

By reacting the latter with N-methylaniline using the manipulative procedure described above in Example 1, there can be obtained N-(2-benzylphenyl)-N'-methyl-N'-phenylformamidine.

EXAMPLE 10.—N-[1-(5,6,7,8-TETRAHYDRONAPHTHYL)]-METHYL-N'-PHENYLFORAMIDINE

By reacting 1-amino-5,6,7,8-tetrahydronaphthalene with ethyl orthoformate in anhydrous ethanolic hydrogen chloride using the manipulative procedure described above in Example 1, there can be obtained ethyl 1-(5,6,7,8-tetrahydronaphthyl)formimidate.

By reacting the latter with N-methylaniline using the manipulative procedure described above in Example 1, there can be obtained N-[1-(5,6,7,8-tetrahydronaphthyl)]-N'-methyl-N'-phenylformamidine.

B. *Via the reaction of an arylamine, an amide, and phosphorus oxychloride*

EXAMPLE 11.—N-(2,6-DIMETHYLPHENYL)-N'-METHYL-N'-PHENYLFORMAMIDINE

A mixture of 107 g. (1.0 mole) of N-methylaniline and 57.5 g. (1.25 moles) of formic acid was heated on a stream bath for eighteen hours, then cooled, mixed with water, and extracted with ether. The extracts were dried over Drierite®, the solvent removed by distillation, and the residue fractionated to give 117 g. of N-methylformanilide, B.P. 116–121° C./8 mm.

To a solution of 104 g. (0.77 mole) of N-methylformanilide in 150 ml. of benzene was added a solution of 59 g. (0.385 mole) of phosphorus oxychloride in 150 ml. of benzene. The mixture was stirred for six hours and then treated over a period of thirty minutes with a solution of 93.2 g. (0.77 mole) of 2,6-dimethylaniline in 150 ml. of benzene while maintaining the temperature in the range from 35 to 40° C. The combined mixture was stirred at room temperature for five hours, then poured rapidly into a solution of 170 ml. of 35% sodium hydroxide in 1 liter of ice water. The layers were separated, and the aqueous layer extracted with chloroform. The combined organic extracts were dried over potassium carbonate, taken to dryness in vacuo, the residue fractionated, and the fraction boiling at 147–165° C./0.3 mm. was collected as product and crystallized from n-pentane giving 65.5 g. of N-(2,6-dimethylphenyl)-N'-methyl-N'-phenylformamidine, M.P. 47–49° C. (uncorr.).

*Analysis.*—Calcd. for $C_{16}H_{19}N_2$: C, 80.63; H, 7.61; N, 11.76. Found: C, 80.54; H, 7.67; N, 12.07.

EXAMPLE 12

N-(2,5-dimethylphenyl)-N'-methyl-N'-phenylformamidine was prepared from 200 g. (1.48 moles) of N-methylformanilide, 91 g. (0.75 mole) of 2,5-dimethylaniline, and 114.6 g. (0.75 mole) of phosphorus oxychloride in a total volume of 900 ml. of benzene, using the manipulative procedure described above in Example 11. The crude product was purified by distillation in vacuo to give N-(2,5-dimethylphenyl)-N'-methyl-N'-phenylformamidine, B.P. 165–173° C./0.3 mm. The distillate, on crystallization from hexane, gave 103 g. of material of M.P. 79–81° C. (uncorr.).

EXAMPLE 13

N-(4-chloro-2-methylphenyl)-N'-methyl-N'-phenylformamidine was prepared from 200.0 g. (1.48 moles) of N-methylformanilide, 116 g. (0.75 mole) of 4-chloro-2-methylaniline, and 114.6 g. (0.75 mole) of phosphorus oxychloride in a total of 900 ml. of benzene using the manipulative procedure described above in Example 11. The crude product was crystallized from ethanol giving 107 g. of N-(4-chloro-2-methylphenyl)-N'-methyl-N'-phenylformamidine, M.P. 60–62° C. (uncorr.).

EXAMPLE 14

N-(2-methylphenyl)-N'-methyl-N'-phenylformamidine was prepared from 200 g. (1.48 moles) of N-methylformanilide, 81 g. (0.75 mole) of o-toluidine, and 114.6 g. (0.75 mole) of phosphorus oxychloride in a total of 900 ml. of benzene using the manipulative procedure described above in Example 11. The crude product was crystallized from isopropyl acetate giving 122.5 g. of N-(2-methylphenyl)-N'-methyl-N'-phenylformamidine, M.P. 95–100° C. (uncorr.).

EXAMPLE 15.—N-(5-METHYL-4-PYRIMIDYL)N'-METHYL-N'-PHENYLFORMAMIDINE

By reacting 4-amino-5-methylpyrimidine with the phosphorus oxychloride adduct of N-methylformanilide using the manipulative procedure described above in Example 11, there can be obtained N-(5-methyl-4-pyrimidyl)-N'-methyl-N'-phenylformamidine.

EXAMPLE 16.—N-(1-METHYL-2-NAPHTHYL)-N'-METHYL-N'-PHENYLFORMAMIDINE

By reacting 1-methyl-2-naphthylamine with the phosphorus oxychloride adduct of N-methylformanilide using the manipulative procedure described above in Example 11, there can be obtained N-(1-methyl-2-naphthyl)-N'-methyl-N'-phenylformamidine.

II. PREPARATION OF THE FINAL PRODUCTS OF FORMULA I

EXAMPLE 17.—INDOLE

A mixture of 19.5 g. (0.5 mole) of sodamide in 108 ml. (1.0 mole) of N-methylaniline was heated under reflux with stirring for thirty minutes, treated with 100 ml. of mineral oil, and then heated and stirred at 290° C. while distilling off the excess N-methylaniline. To the hot mixture was then added 56 g. (0.25 mole) of N-(2-methylphenyl)-N'-methyl-N'-phenylformamidine, and the mixture was heated with stirring at 300° C. for thirty-five minutes. The mineral oil was decanted, the residue overlayed with ether and the sodium salts decomposed with 100 ml. of water while cooling in an ice bath. The aqueous layer was separated, extracted with ether and the combined organic extracts dried and taken to dryness. Distillation of the residue gave 22.3 (76.5%) of indole, B.P. 131–137° C./22 mm.

EXAMPLE 18

7-methylindole was prepared from 29.2 g. (0.75 mole) of sodamide in 161 g. (1.5 moles) of N-methylaniline, 59.5 g. (0.25 mole) of N-(2,6-dimethylphenyl)-N'-methyl-N'-phenylformamidine, and 100 ml. of mineral oil using the manipulative procedure described above in Example 17. The reaction mixture was heated at 245° C. for fifteen minutes. The crude product was purified by distillation in vacuo giving 26.3 g. (80%) of 7-methylindole, B.P. 83–86° C./0.3 mm. On standing, the product crystallized to give material of M.P. 76–83° C. (uncorr.).

EXAMPLE 19

6-methylindole was prepared from 29.2 g. (0.75 mole) of sodamide in 161 g. (1.5 moles) of N-methylaniline, 59.5 g. (0.25 mole) of N-(2,5-dimethylphenyl)-N'-methyl-N'-phenylformamidine, and 100 ml. of mineral oil using the manipulative procedure described above in Example 17. The product was purified by distillation to give 17.2 g. of 6-methylindole, B.P. 79–82.5° C./0.5 mm.; $n_D^{25} = 1.5824$.

EXAMPLE 20

5-methoxyindole can be prepared using the manipulative procedure described above in Example 17 by reacting sodium N-methylanilide with the N-(2-methyl-4-methoxyphenyl)-N'-methyl-N'-phenylformamidine, prepared above in Example 3.

EXAMPLE 21

5-chloroindole can be prepared using the manipulative procedure described above in Example 17 by reacting sodium N-methylanilide with the N-(4-chloro-2-methylphenyl)-N'-methyl-N'-phenylformamidine, prepared above in Example 13.

EXAMPLE 22

7-azaindole was prepared from 35 g. (0.9 mole) of sodamide in 214 g. (2.0 moles) of N-methylaniline and 67.6 g. (0.3 mole) of N-(3-methyl-2-pyridyl)-N'-methyl-N'-phenylformamidine dissolved in 25 ml. of N-methylaniline. The reaction mixture was heated under reflux for five minutes and then the excess N-methylaniline was distilled off over a period of twenty minutes. The cooled residue was overlayed with ether, decomposed with water, extracted further with ether and the ether extracts taken to dryness. The crude product was purified by distillation in vacuo to give 26.5 g. (75%) of 7-azaindole, B.P. 90–104° C./0.1 mm. Recrystallization from benzene-hexane gave material of M.P. 101–105° C. (uncorr.).

In another run in which the molar ratio of sodium N-methylanilide to N-(3-methyl-2-pyridyl)-N'-methyl-N'-phenylformamidine was 1.5:1, a 73% yield of 7-azaindole was obtained.

EXAMPLE 23

5-methyl-4-azaindole was prepared from 23.4 g. (0.6 mole) of sodamide in 129 g. (1.2 moles) of N-methylaniline, and 71.9 g. (0.3 mole) of N-(2,6-dimethyl-3-pyridyl)-N'-methyl-N'-phenylformamidine using the manipulative procedure described above in Example 22. The reaction mixture was heated at 196–200° C. for twenty minutes and the crude product purified by sublimation to give 0.7 g. of 5-methyl-4-azaindole, M.P. 205–207° C. (uncorr.).

EXAMPLE 24

5-azaindole was prepared from 23.4 g. (0.6 mole) of sodamide in 129 g. (1.2 moles) of N-methylaniline, and 67.6 g. (0.3 mole) of N-(3-methyl-4-pyridyl)-N'-methyl-N'-phenylformamidine using the manipulative procedure described above in Example 22. The reaction mixture was heated at 200° C. for thirty minutes. The crude product was purified by distillation in vacuo giving 20 g. (57%) of 5-azaindole, B.P. 110–132° C./0.2 mm. A small sample, recrystallized from isopropyl acetate-hexane, gave material of M.P. 109–111° C. (uncorr.).

EXAMPLE 25.—3-METHYLINDOLE

By reacting N-(2-ethylphenyl)-N'-methyl-N'-phenylformamidine with sodium N-methylanilide in N-methylaniline using the manipulative procedure described above in either Example 17 or 22, there can be obtained 3-methylindole.

EXAMPLE 26.—2-METHYLINDOLE

By reacting N-(2-methylphenyl)-N'-methyl-N'-phenylacetamidine with sodium N-methylanilide in N-methylaniline using the manipulative procedure described above in either Example 17 or 22, there can be obtained 2-methylindole.

EXAMPLE 27.—1H-PYRROLO[2,3-b]QUINOLINE

By reacting N-(3-methyl-2-quinolyl)-N'-methyl-N'-phenylformamidine with sodium N-methylanilide in N-methylaniline using the manipulative procedure described above in either Example 17 or 22, there can be obtained 1H-pyrrolo[2,3-b]quinoline.

EXAMPLE 28.—3-PHENYLINDOLE

By reacting N-(2-benzylphenyl)-N'-methyl-N'-phenylformamidine with sodium N-methylanilide in N-methylaniline using the manipulative procedure described above in either Example 17 or 22, there can be obtained 3-phenylindole.

EXAMPLE 29.—1,3,4,5-TETRAHYDROBENZ[c,d]INDOLE

By reacting N-[1-(5,6,7,8-tetrahydronaphthyl)]-N'-methyl-N'-phenylformamidine with sodium N-methylanilide in N-methylaniline using the manipulative procedure described above in either Example 17 or 22, there can be obtained 1,3,4,5-tetrahydrobenz[c,d]indole.

EXAMPLE 30.—7H-PYRROLO[2,3-d]PYRIMIDINE

By reacting N-(5-methyl-4-pyrimidyl)-N'-methyl-N'-phenylformamidine with sodium N-methylanilide in N-methylaniline using the manipulative procedure described above in either Example 17 or 22, there can be obtained 7H-pyrrolo[2,3-d]pyrimidine.

EXAMPLE 31.—3H-BENZ[e]INDOLE

By reacting N-(1-methyl-2-naphthyl)-N'-methyl-N'-phenylformamidine with sodium N-methylanilide in N-methylaniline using the manipulative procedure described above in either Example 17 or 22, there can be obtained 3H-benz[e]indole.

The products prepared by the process can also be obtained directly by reacting a lower-alkyl aryl-imidate ester with the sodium salt of either a primary arylamine or a secondary N-lower-alkyl-arylamine in the presence of excess amine as illustrated by the procedures given in Examples 32 and 33 following.

EXAMPLE 32.—7-AZAINDOLE

To a mixture of 224 g. (2.4 moles) of aniline and about 2.0 g. of nickel oxide was added 27.4 g. (1.2 moles) of sodium in pieces. When all of the sodium had been added and the reaction was complete, the mixture was cooled to about 80° C. and treated carefully with 66 g. (0.4 mole) of ethyl (3-methyl-2-pyridyl)-formimidate. After the exothermic reaction had subsided, the mixture was heated slowly to 200° C. and then diluted with 400 ml. of mineral oil. The temperature was gradually raised to 300° C. while distilling off the excess aniline, and the mixture was heated with stirring for forty-five minutes. On cooling, the mineral oil was decanted and the reaction mixture worked up as described above in Example 17. Distillation of the crude product gave 19 g. (40.5%) of 7-azaindole, B.P. 100–110° C./0.5 mm.

EXAMPLE 33.—7-AZAINDOLE

A mixture of 39 g. (1.0 mole) of sodamide in 236 g. of N-methylaniline (2.2 moles) was heated under reflux for one hour, cooled to 120° C. and then treated carefully with 41 g. (0.25 mole) of ethyl (3-methyl-2-pyridyl)- formimidate. The mixture was heated under reflux with stirring for one hour and the excess N-methylaniline was distilled off, a total of 150 ml. being collected. The residue was treated with water, the mixture was extracted with ether, and the ether extracts dried and fractionated after removal of the ether to give an additional 72 ml. of N-methylaniline (222 ml. total recovered or 93% recovery) and 15.5 g. (52%) of 7-azaindole.

By following the manipulative procedure described above in Example 1, substituting for the o-toluidine used therein an appropriate substituted-o-toluidine or an appropriate o-substituted-benzylaniline, and reacting the resulting N - (substituted - phenyl) - N' - methyl - N'-phenylformamidine with sodium N-methylanilide in N-methylaniline using the manipulative procedure described above in Example 22, other substituted-indoles of general formula I can be prepared as follows:

6-methylmercaptoindole from N-(2-methyl-5-methylmercaptophenyl)-N'-methyl-N'-phenylformamidine;
6-methylsulfonylindole from N-(2-methyl-5-methylsulfonylphenyl)-N'-methyl-N'-phenylformamidine;
5,6-dimethoxyindole from N-(2-methyl-4,5-dimethoxyphenyl)-N'-methyl-N'-phenylformamidine;
6-trifluoromethylindole from N-(2-methyl-5-trifluoromethylphenyl)-N'-methyl-N'-phenylformamidine;
6-sulfamylindole from N-(2-methyl-5-sulfamylphenyl)-N'-methyl-N'-phenylformamidine;
5,6-methylenedioxyindole from N-(2-methyl-4,5-methylenedioxyphenyl)-N'-methyl-N'-phenylformamidine;
5-benzyloxyindole from N-(2-methyl-4-benzyloxyphenyl)-N'-methyl-N'-phenylformamidine;
6-nitroindole from N-(2-methyl-5-nitrophenyl)-N'-methy-N'-phenylformamidine;
6-cyanoindole from N-(2-methyl-5-cyanophenyl)-N'-methyl-N'-phenylformamidine;
6-diethylaminoindole from N-(2-methyl-5-diethylaminophenyl)-N'-methyl-N'-phenylformamidine;
3-(4-methylphenyl)indole from N-[2-(4-methylbenzyl)-phenyl]-N'-methyl-N'-phenylformamidine;
3-(3-chlorophenyl)indole from N-[2-(3-chlorobenzyl)-phenyl]-N'-methyl-N'-phenylformamidine;
3-(4-methoxyphenyl)indole from N-[2-(4-methoxybenzyl)phenyl]-N'-methyl-N'-phenylformamidine;
3-(3,4-dimethoxyphenyl)indole from N-[2-(3,4-dimethoxybenzyl)-phenyl]-N'-methyl-N'-phenylformamidine;
3-(3-methylmercaptophenyl)indole from N-[2-(3-methylmercaptobenzyl)-phenyl]-N'-methyl-N'-phenylformamidine;
3-(3-methylsulfonylphenyl)indole from N-[2-(3-methylsulfonylbenzyl)-phenyl]-N'-methyl-N'-phenylformamidine;
3-(3-trifluoromethylphenyl)indole from N-[2-(3-trifluoromethylbenzyl)phenyl]-N'-methyl-N'-phenylformamidine;
3-(4-sulfamylphenyl)indole from N-[2-(4-sulfamylbenzyl)phenyl]-N'-methyl-N'-phenylformamidine;
3-(3,4-methylenedioxyphenyl)indole from N-[2-(3,4-methylenedioxybenzyl)phenyl]-N'-methyl-N'-phenylformamidine;
3-(3-benzyloxyphenyl)indole from N-[2-(3-benzyloxybenzyl)phenyl]-N'-methyl-N'-phenylformamidine;
3-(4-nitrophenyl)indole from N-[2-(4-nitrobenzyl)-phenyl]-N'-methyl-N'-phenylformamidine;
3-(4-cyanophenyl)indole from N-[2-(4-cyanobenzyl)-phenyl]-N'-methyl-N'-phenylformamidine; and
3-(4-diethylaminophenyl)indole from N-[2-(4-diethylaminobenzyl)-phenyl]-N'-methyl-N'-phenylformamidine.

By following the manipulative procedure described above in Example 22, indole can be prepared by heating N - (2 - methylphenyl) - N' - methyl - N' - (3 - methylphenyl) - N' - methyl - N' - (1 - naphthyl)formamidine; N' - (4 - methylphenyl)formamidine; N - (2 - methylphenyl) - N' - methyl - N' - (1 - naphthyl)formamidine; or N - (2 - methylphenyl) - N' - methyl - N' - (2-naphthyl)formamidine with, respectively, sodium N-methyl-m - toluidide in N - methyl - m - toluidine; sodium N - methyl - p - toluidide in N - methyl - p - toluidine; sodium N - methyl - α - naphthylamine salt in N-methyl - α - naphthylamine; or sodium N - methyl - β-naphthylamine salt in N-methyl-β-naphthylamine.

We claim:

1. The process for preparing a compound of the formula

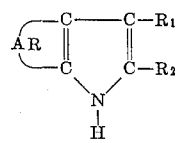

wherein AR, together with the C=C group to which it is attached, represents an aryl nucleus fused to the pyrrole ring; $R_1$ represents a member of the group consisting of hydrogen, lower-alkyl, and phenyl; and $R_2$ represents a member of the group consisting of hydrogen and lower-alkyl, which comprises reacting under non-hydrolytic conditions a compound of the formula

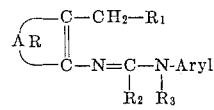

with a compound of the formula

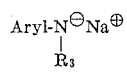

wherein AR, $R_1$, and $R_2$ have the meanings given above, Aryl represents a member of the group consisting of phenyl, m-tolyl, p-tolyl, α-naphthyl, and β-naphthyl, and $R_3$ represents a member of the group consisting of hydrogen and lower-alkyl and hydrolyzing the resulting reaction mixture.

2. The process for preparing a compound of the formula

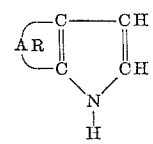

wherein AR, together with the C=C group to which it is attached, represents a benzene nucleus fused to the pyrrole ring, which comprises reacting under non-hydrolytic conditions a compound of the formula

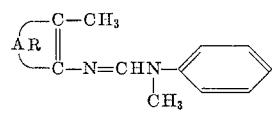

where AR has the meaning given above, with sodium N-methylanilide and hydrolyzing the resulting reaction mixture.

3. The process for preparing a compound of the formula

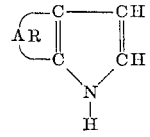

wherein AR, together with the C=C group to which it is attached, represents a pyrido[2,3-b] nucleus fused to the pyrrole ring, which comprises reacting under non-hydrolytic conditions a compound of the formula

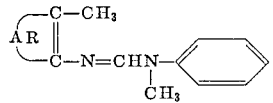

where AR has the meaning given above, with sodium N-methylanilide and hydrolyzing the resulting reaction mixture.

4. The process for preparing a compound of the formula

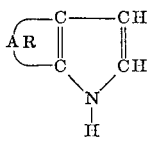

wherein AR, together with the C=C group to which it it attached, represents a pyrido[3,2-b] nucleus fused to the pyrrole ring, which comprises reacting under non-hydrolytic conditions a compound of the formula

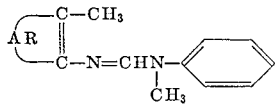

wherein AR has the meaning given above, with sodium N-methylanilide and hydrolyzing the resulting reaction mixture.

5. The process for preparing indole which comprises reacting N - (2-methylphenyl)-N'-methyl-N'-phenylformamidine with sodium N-methylanilide under non-hydrolytic conditions and hydrolyzing the resulting reaction mixture.

6. The process for preparing 7-methylindole which comprises reacting N-(2,6-dimethylphenyl)-N'-methyl-N'-phenylformamidine with sodiumN-methylanilide under non-hydrolytic conditions and hydrolyzing the resulting reaction mixture.

7. The process for preparing 6-methylindole which comprises reacting N-(2,5-dimethylphenyl)-N'-methyl-N'-phenylformamidine with sodium N-methylanilide under non-hydrolytic conditions and hydrolyzing the resulting reaction mixture.

8. The process for preparing 7-azaindole which comprises reacting N - (3 - methyl - 2 - pyridyl)-N'-methyl-N'-phenylformamidine with sodium N-methylanilide under non-hydrolytic conditions and hydrolyzing the resulting reaction mixture.

9. The process for preparing 5 - methyl - 4 - azaindole which comprises reacting N-(2,6-dimethyl-3-pyridyl)-N'-methyl-N'-phenylformamidine with sodium N-methylanilide under non-hydrolytic conditions and hydrolyzing the resulting reaction mixture.

10. The process for preparing a compound of the formula

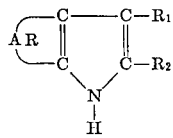

wherein AR, together with the C=C group to which it is attached, represents an aryl nucleus fused to the pyrrole ring; $R_1$ represents a member of the group consisting of hydrogen, lower-alkyl, and phenyl; and $R_2$ represents a member of the group consisting of hydrogen and lower-alkyl, which comprises reacting under non-hydrolytic conditions a compound of the formula

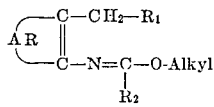

wherein AR, $R_1$, and $R_2$ have the meanings given above and Alkyl represents lower-alkyl, with a molar excess of a compound of the formula

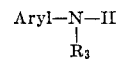

and at least two molar equivalents of the sodium salt of the latter and wherein Aryl represents a member of the group consisting of phenyl, m-tolyl, p-tolyl, α-naphthyl, and β-naphthyl, and $R_3$ represents a member of the group consisting of hydrogen and lower-alkyl and hydrolyzing the resulting reaction mixture.

11. The process for preparing a compound of the formula

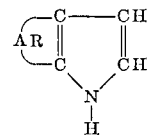

wherein AR, together with the C=C group to which it is attached, represents a benzene nucleus fused to the pyrrole ring, which comprises reacting under non-hydrolytic conditions a compound of the formula

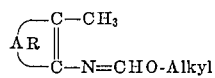

wherein AR has the meaning given above and Alkyl represents lower-alkyl, with a molar excess of N-methylaniline and at least two molar equivalents of sodium N-methylanilide and hydrolyzing the resulting reaction mixture.

12. The process for preparing a compound of the formula

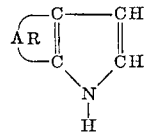

wherein AR, together with the C=C group to which it is attached, represents a pyrido[2,3-b] nucleus fused to the pyrrole ring, which comprises reacting under non-hydrolytic conditions a compound of the formula

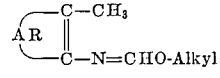

wherein AR has the meaning given above and Alkyl represents lower-alkyl, with a molar excess of N-methylaniline and at least two molar equivalents of sodium N-methylanilide and hydrolyzing the resulting reaction mixture.

13. The process for preparing 7-azaindole which comprises reacting ethyl N-(3-methyl-2-pyridyl)formimidate with a molar excess of N-methylaniline under non-hydrolytic conditions and at least two molar equivalents of sodium N-methylanilide and hydrolyzing the resulting reaction mixture.

14. The process for preparing indole which comprises reacting ethyl (2-methylphenyl)formimidate with a molar excess of N-methylaniline under non-hydrolytic conditions and at least two molar equivalents of sodium N-methylanilide and hydrolyzing the resulting reaction mixture.

15. A compound of the formula

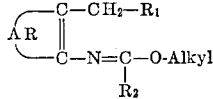

wherein AR, together with the C=C group to which it is attached, represents pyrimido- or quinolino; $R_1$ represents a member of the group consisting of hydrogen, lower-alkyl, and phenyl; $R_2$ represents a member of the group consisting of hydrogen and lower-alkyl; and Alkyl represents lower-alkyl.

16. A compound of the formula

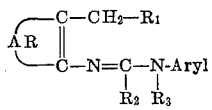

wherein AR together with the C=C group to which it is attached, represents pyrido-, pyrimido-, or quinolino-; $R_1$ represents a member of the group consisting of hydrogen, lower-alkyl, and phenyl; $R_2$ represents a member of the group consisting of hydrogen and lower-alkyl; $R_3$ represents a member of the group consisting of hydrogen and lower-alkyl; and Aryl represents a member of the group consisting of phenyl, m-tolyl, p-tolyl, α-naphthyl, and β-naphthyl.

17. N - (3 - methyl - 2 - pyridyl)-N'-methyl-N'-phenylformamidine.
18. Ethyl (3-methyl-2-quinolyl)formimidate.
19. N - (2,6 - dimethyl - 3 - pyridyl) - N' - methyl-N'-phenylformamidine.
20. N - (3 - methyl - 4 - pyridyl) - N' - methyl - N'-phenylformamidine.
21. N - (3 - methyl - 2 - quinolyl) - N' - methyl - N'-phenylformamidine.
22. N - (5 - methyl - 4 - pyrimidyl) - N' - methyl - N'-phenylformamidine.

References Cited by the Examiner

UNITED STATES PATENTS

| | | | |
|---|---|---|---|
| 2,107,379 | 2/1938 | Koslowsky | 260—240.6 |
| 2,515,878 | 7/1950 | Knott | 260—240 |
| 2,743,272 | 4/1956 | Knott | 260—240 |
| 2,811,530 | 10/1957 | Poizat et al. | 260—319 |
| 3,119,831 | 1/1964 | Homer | 260—296 |
| 3,182,053 | 5/1965 | Steiger | 260—296 |

FOREIGN PATENTS 585,708 2/1947 Great Britain.

OTHER REFERENCES

Beilstein's Handbuch der Organischen Chemie, 4th Ed., vol. 12, pp. 791, 793 to 794, 1230, 1232 and 1285, Verlag Springer, Berlin, Germany (1929).

Brunnett: J. Am. Chem. Soc., vol. 83, p. 4971 (1961).

De Wolfe: J. Am. Chem. Soc., vol. 82, pp. 1585 to 1590 (1960).

Ederfield: Heterocyclic Compounds, vol. 3, pp. 16 to 17, John Wiley and Sons, Inc., London, England (1952).

Elsevier's Encyclopaedia of Organic Chemistry, vol. 12 B, Series III, pp. 459 to 461 and 564 to 565, Elsevier Publishing Co., Inc., N.Y. (1949).

Grunfeld: Bull. Soc. Chim. France, 5th Series, vol. 3, pp. 668 to 674 (1936).

Klingsberg: Pyridine and Derivatives, part two, p. 199, Interscience Publishers, Inc., N.Y. (1961).

Roberts et al.: J. Am. Chem. Soc., vol. 73, pp. 2277–2281 (1951).

Tyson: J. Am. Chem. Soc., vol. 72, pp. 2801–2803 (1950).

JOHN D. RANDOLPH, *Primary Examiner.*

UNITED STATES PATENT OFFICE
CERTIFICATE OF CORRECTION

Patent No. 3,272,804            September 13, 1966

Sydney Archer et al.

It is hereby certified that error appears in the above numbered patent requiring correction and that the said Letters Patent should read as corrected below.

Column 1, line 56, for "sulfamyl" read -- sulfamoyl --; column 2, line 20, for "compound" read -- compounds --; column 3, lines 64 to 69, the last formula should appear as shown below instead of as in the patent:

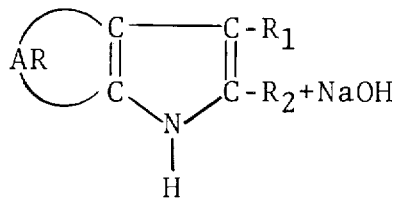

column 8, line 52, for "minipulative" read -- manipulative --; column 9, line 28, for "N-(2-Benylphenyl)" read -- N-(2-Benzylphenyl) --; column 9, line 40, for "]-METHYL-N'-PHENYLFOR-AMIDINE" read -- ]-N'-METHYL-N'-PHENYLFORMAMIDINE --; line 58, for "stream" read -- steam --; column 10, line 28, for "ethanol" read -- methanol --; line 42, for "pyrimidyl)" read -- pyrimidyl)- --; column 13, line 73, after "phenyl)" strike out "-N'-methyl-N'-(1-naphthyl)formamidine;" and insert instead -- formamidine; N-(2-methylphenyl)-N'-methyl- --; column 16, line 64, after "N-methylanilide" insert -- under non-hydrolytic conditions --; lines 69 and 70, after "N-methylanilide" insert -- under non-hydrolytic conditions --.

Signed and sealed this 26th day of September 1967.

(SEAL)
Attest:

ERNEST W. SWIDER            EDWARD J. BRENNER
Attesting Officer            Commissioner of Patents